(12) United States Patent
Jeppesen et al.

(10) Patent No.: US 11,549,486 B2
(45) Date of Patent: Jan. 10, 2023

(54) BLADE PITCH CONTROL MONITORING SYSTEM FOR A WIND TURBINE

(71) Applicant: VESTAS WIND SYSTEMS A/S, Aarhus (DK)

(72) Inventors: Christian Jeppesen, Aarhus (DK); Silvia Estelles Martinez, Vila Do Conde (PT)

(73) Assignee: VESTAS WIND SYSTEMS A/S, Aarhus N (DK)

(*) Notice: Subject to any disclaimer, the term of this patent is extended or adjusted under 35 U.S.C. 154(b) by 18 days.

(21) Appl. No.: 17/190,293

(22) Filed: Mar. 2, 2021

(65) Prior Publication Data

US 2021/0270235 A1 Sep. 2, 2021

(30) Foreign Application Priority Data

Mar. 2, 2020 (DK) .......................... PA 2020 70131

(51) Int. Cl.
*F03D 7/02* (2006.01)
*F03D 17/00* (2016.01)
*F03D 7/04* (2006.01)

(52) U.S. Cl.
CPC .......... *F03D 7/0224* (2013.01); *F03D 17/00* (2016.05); *F03D 7/042* (2013.01); *F05B 2270/328* (2013.01)

(58) Field of Classification Search
CPC ... F03D 7/0224; F03D 17/00; F05B 2270/328
See application file for complete search history.

(56) References Cited

U.S. PATENT DOCUMENTS 9,752,561 B2 * 9/2017 Egedal ................. F03D 7/0224
2010/0135789 A1 6/2010 Zheng et al.
(Continued)

FOREIGN PATENT DOCUMENTS

EP 3409940 A1 12/2018
EP 3597905 A1 1/2020
(Continued)

OTHER PUBLICATIONS

Danish Patent and Trademark Office Search Report for Application No. PA 2020 70131 dated Aug. 12, 2020.
(Continued)

*Primary Examiner* — Michael L Sehn
(74) *Attorney, Agent, or Firm* — Patterson + Sheridan, LLP

(57) ABSTRACT

A method is provided for monitoring a pitch control system for a rotor blade of a wind turbine. The method comprises a step of receiving a blade pitch signal representative of a pitch position of the rotor blade, a step of determining a pitch deviation, based on the blade pitch signal and a blade pitch reference. If the determined pitch deviation exceeds a first pitch deviation threshold, a pitch deviation variable is increased by an amount that depends on the determined pitch deviation, the first pitch deviation threshold, and a duration of a time period during which the determined pitch deviation has been exceeding the first pitch deviation threshold. An error signal is provided when the increased pitch deviation variable exceeds a pitch deviation variable threshold.

9 Claims, 3 Drawing Sheets

(56) References Cited

U.S. PATENT DOCUMENTS

2011/0158805 A1\* 6/2011 Miranda ............... F03D 7/0224
                                                        416/31
2012/0061962 A1   3/2012 Nagasaki
2015/0337802 A1   11/2015 Su et al.
2020/0011294 A1   1/2020 Baba

FOREIGN PATENT DOCUMENTS

WO   2010069323 A2   6/2010
WO   2016198076 A1   12/2016
WO   2017167343 A1   10/2017
WO   2020094752 A1   5/2020

OTHER PUBLICATIONS

Danish Patent and Trademark Office 1st Technical Examination for Application Number PA 2020 70131 dated Aug. 19, 2020.
Extended European Search Report for Application No. 21158570.8-1007 dated Jul. 29, 2021.
European Patent Office, Communication Pursuant to Article 94(3) EPC for Application 21 158 570.8-1002 dated Jun. 15, 2022.

\* cited by examiner

BLADE PITCH CONTROL MONITORING SYSTEM FOR A WIND TURBINE

FIELD OF THE INVENTION

The invention relates to approaches, systems and methods for monitoring the operation of a blade pitch system of a wind turbine and particularly for detecting operation errors.

TECHNICAL BACKGROUND

A modern utility-scale wind turbine includes a set of rotor blades which are attached to a hub and which are configured to pitch about their longitudinal axis in order to change the angle of attack of the blades with respect to the wind. In this way, the lift of the blade can be controlled precisely in order to optimise energy generation whilst limiting mechanical loads on the system.

In known systems the blades are attached to the hub of the wind turbine by a blade bearing which allows the blades to rotate relative to the hub. A pitch actuator connects between the hub and each blade in order to provide a driving force to control the pitch angle of the blade. In one known approach the pitch actuator takes the form of a linear hydraulic actuator that is mounted to the hub at one end whereby a push rod of the actuator is attached to a part of the blade root. Extension and contraction of the hydraulic actuator causes the blade to pitch about the blade axis. In another known approach, the pitch actuator may be embodied by one or more electric motors that are coupled to a drive gear associated with the blade. Operation of the motors therefore controls the pitch of the blade.

In either approach, a pitch control system controls the operation of the pitch actuator to ensure that the blade pitch angle is set to a desired position. The pitch control system either determines or receives a blade pitch angle reference signal. Safe operation of the wind turbine may include a monitoring sub-system of the pitch control system to ensure that the blades are being pitched correctly, since deviation from the pitch angle reference signal is undesirable as this can have an adverse effect on energy generation and blade loads.

A typical approach is for a monitoring sub-system to compare the pitch angle reference signal against the actual pitch angle for each blade and to indicate a warning flag if a predetermined error threshold is exceeded.

It is against this background that the invention has been devised.

SUMMARY OF THE INVENTION

According to a first aspect of the invention, a method is provided for monitoring a pitch control system for a rotor blade of a wind turbine. The method comprises a step of receiving a blade pitch signal representative of a pitch position of the rotor blade, a step of determining a pitch deviation, based on the blade pitch signal and a blade pitch reference. If the determined pitch deviation exceeds a first pitch deviation threshold, a pitch deviation variable is increased by an amount that depends on the determined pitch deviation, the first pitch deviation threshold, and a duration of a time period during which the determined pitch deviation has been exceeding the first pitch deviation threshold. An error signal is provided when the increased pitch deviation variable exceeds a pitch deviation variable threshold.

In this, 'pitch deviation' can be defined as the difference between a measured pitch angle and a set pitch angle that may be provided as a blade pitch reference signal by a main controller of the wind turbine. Such a deviation may, e.g., be expressed as a number of angular degrees or as a percentage of the set pitch angle. The pitch deviation variable is typically a dimensionless variable that is calculated by the pitch monitoring and control system in order to keep track of the development of the pitch deviation over time. As will be explained below, the pitch variable may, e.g., be a running counter value that is increased when the pitch deviation exceeds the first pitch deviation threshold, or just a running counter value that only reflects a duration of a time period spent above the first pitch deviation threshold, multiplied by some factor, dependent on the most recent pitch deviation measurement. Other algorithms may calculate the pitch deviation variable in many different ways. For obtaining the benefits of the invention, it is however important that the pitch deviation variable at least depends on the determined pitch deviation, the first pitch deviation threshold, and a duration of a time period during which the determined pitch deviation has been exceeding the first pitch deviation threshold.

An important advantage of the method according to the invention is that it can distinguish between smaller and bigger pitch deviations and allows bespoke control strategies that are, e.g., more responsive to longer periods of relatively small pitch deviations or to shorter periods of relatively large pitch variations.

A further advantage is that the invention enables to capture failure in the hydraulic systems on short time scale, even down to below 1 sec.

It is to be noted that the duration of a time period during which the determined pitch deviation has been exceeding the first pitch deviation threshold may, e.g., refer to a sampling time in which the just determined pitch deviation was measured. Alternatively, this may refer to a total duration of a continuous time period during which the determined pitch deviation has already been exceeding the first pitch deviation threshold. Such a total duration may, e.g., be measured from the first moment that the first pitch deviation threshold is exceeded, or from the most recent moment when the first pitch deviation threshold was exceeded. The amount for increasing the pitch deviation variable may, e.g., be proportional to the duration of such a continuous time period.

When the pitch deviation drops below the first pitch deviation threshold, different strategies can be followed for adjusting the pitch deviation variable. Preferably, the pitch deviation variable is reduced in some way to avoid that, over time, even very small and short deviation can trigger an error signal. For example, when the determined pitch deviation is below the first pitch deviation threshold, the pitch deviation variable may be decreased by an amount that depends on the determined pitch deviation. If the pitch deviation stays under the first pitch deviation for a long enough time period, it will eventually become zero. Alternatively, the pitch deviation variable is reset instantly when as soon as the determined pitch deviation is below the first pitch deviation threshold.

In an embodiment of the invention, the amount for increasing the pitch deviation variable further depends on a second pitch deviation threshold, the second pitch deviation threshold being higher than the first pitch deviation threshold. This second pitch deviation threshold may, e.g., be the pitch deviation at which the wind turbine is to be brought into a safe mode immediately for safety reasons. For pitch deviations between the first and the second pitch deviation threshold, the increase of the pitch deviation variable may depend on how close the pitch deviation is getting to this second pitch deviation threshold.

Like the pitch deviation variable itself, the pitch deviation variable threshold may be dependent on the determined pitch deviation too. For example, the threshold may be increased (possibly temporarily) for larger pitch deviations in order to avoid an immediate shut down of the wind turbine when a larger, but short term, pitch deviation occurs.

In some algorithms for calculating the pitch deviation variable, the amount for increasing the pitch deviation variable may be inversely proportional to the difference between the determined pitch deviation and the first pitch deviation threshold.

The error signal will typically be an electric signal that is communicated to one or more electronic controllers of the wind turbine and may, e.g., be visually or audibly communicated to an operator. The error signal could, in fact, be any type of communication signal, such as e.g. an electromagnetic or optic signal. Preferably, the control system, possibly in the form of a safety system may act upon receiving the error signal, e.g., by shutting down the wind turbine or by rotating the respective rotor blade to a safer pitch angle.

According to a further aspect of the invention, a monitoring system is provided for a pitch control system of a wind turbine. The monitoring system comprises a pitch sensor for measuring a pitch angle of a rotor blade of a wind turbine, the sensor being configured to provide a blade pitch signal representing the measured pitch angle. The monitoring system further comprises a controller, operatively coupled to the pitch sensor for receiving the blade pitch signal therefrom, the controller being configured to perform a monitoring method as described above.

In a preferred embodiment, the monitoring system is configured to selectively run in a first mode or in a second mode. For example, in the first mode the amount for increasing the pitch deviation variable is inversely proportional to the difference between the determined pitch deviation and the first pitch deviation threshold, while in the second mode the amount for increasing the pitch deviation variable is proportional to a continuous time period during which the determined pitch deviation has been exceeding the first pitch deviation threshold and inversely proportional to an order two polynomial form of the difference between the determined pitch deviation and the first pitch deviation threshold. In such a system, the wind turbine can, depending on the circumstances, be tuned to be more responsive to short term larger deviations (first mode) or to longer term smaller deviation (second mode). Other modes may be designed that incorporate aspects of the first and second modes, or follow entirely different strategies.

According to a further aspect of the invention, a safety system for a wind turbine is provided, the safety system comprising a monitoring system as described above and a safety controller, operatively coupled to the monitoring system and configured to operate the wind turbine in a safe mode in response to the error signal. The safe mode may, e.g., comprise a derate in speed or in power, an increase of the blade pitch or a total shutdown of the wind turbine.

According to a further aspect of the invention, a wind turbine is provided comprising at least one rotor blade, a pitch control system for controlling a pitch angle of the at least one rotor blade, and a monitoring or safety system as described above, the monitoring system being configured to monitor the pitch control system and the safety system being configured to operate the wind turbine in a safe mode.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

The above and other aspects of the invention will now be described, by way of example only, with reference to the accompanying drawings, in which.

DETAILED DESCRIPTION OF EMBODIMENTS OF THE INVENTION

Figure 1:
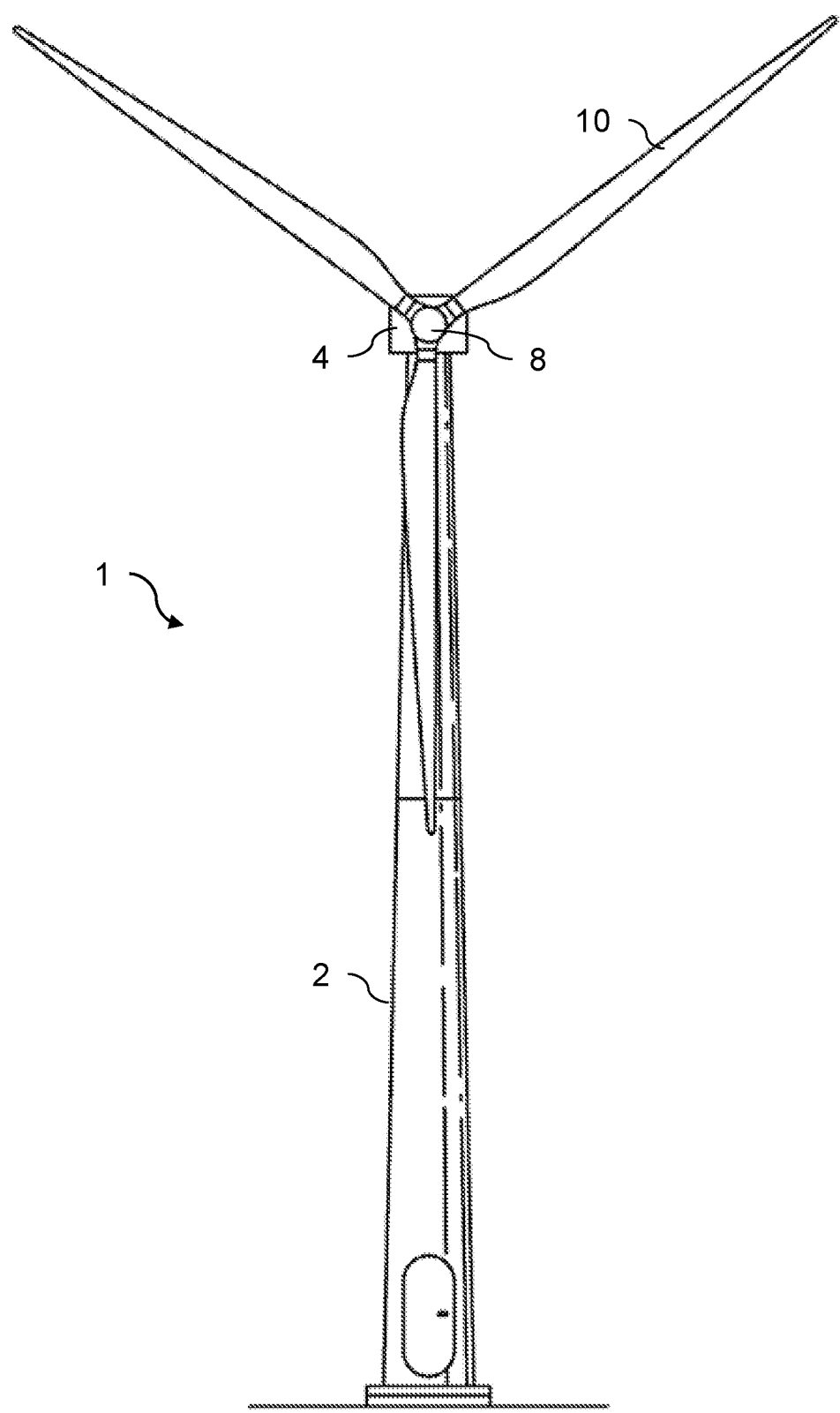
FIG. 1 schematically shows a wind turbine in which the invention could be used.

FIG. 1 schematically shows a wind turbine 1 in which the invention could be used.

The wind turbine 1 shown here is an example of a typical Horizontal Axis Wind Turbine (HAWT) in which a pitch monitoring method according to the invention may be advantageously used. Although this particular image depicts an on-shore wind turbine 1, it will be understood that equivalent features will also be found on off-shore wind turbines. In addition, although the wind turbine 1 is referred to as 'horizontal axis', it will be appreciated by the skilled person that for practical purposes, the axis is usually slightly inclined to prevent contact between the rotor 10 blades and the wind turbine tower 2 in the event of strong winds.

The wind turbine 1 comprises a tower 2, a nacelle 4 rotatably coupled to the top of the tower 2 by a yaw system, a rotor hub 8 mounted to the nacelle 4 and a plurality of wind turbine rotor blades 10 coupled to the rotor hub 8. The nacelle 4 and rotor blades 10 are turned and directed into the wind direction by the yaw system. A pitch control system is provided for rotating the rotor blades 10 around their longitudinal axis in order to control the angle of attack of the rotor blades 10 with respect to the wind. In this way, the lift of the rotor blade 10 can be controlled precisely in order to optimise energy generation whilst limiting mechanical loads on the system.

Figure 2:
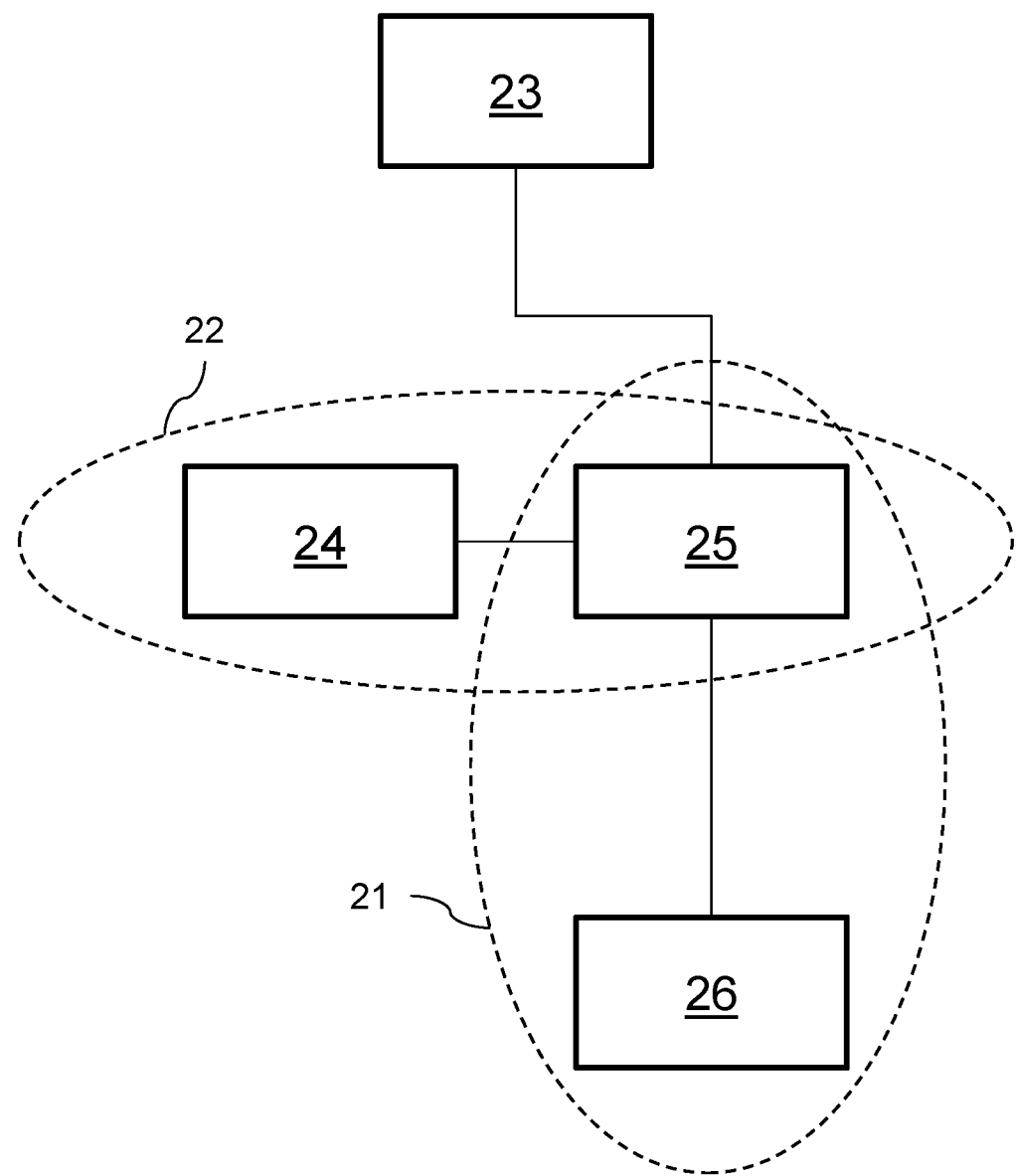
FIG. 2 is block diagram of the control systems involved in an embodiment of the method according to the invention.

FIG. 2 is block diagram of the pitch control system 21 and its relation to some of the other parts of the wind turbine 1. The pitch control system 21 comprises a pitch controller 25 that is configured to receive relevant information from various subsystems of the wind turbine 1 and to process this information in order to establish and execute an optimal control strategy for the pitch angle of the rotor blades 10. A typically hydraulic pitch actuator 26 is electronically controlled by the pitch controller 25 and realises the required rotation of the rotor blade 10 around its longitudinal axis. The pitch control system 21 operates under the command of a master wind turbine control system 23 which is responsible for monitoring the operating parameters of the wind turbine 1 and to output a suitable blade pitch angle reference signal to the pitch control system 21. The pitch controller 25 may be implemented as a computing module in the master wind turbine control system 23, but may also be implemented as a dedicated control system connected to the master wind turbine control system 23. For the monitoring of the pitch of the rotor blades 10, the wind turbine 1 uses a pitch monitoring system 22. The pitch monitoring system 22 comprises a pitch sensor 24 for measuring a pitch angle of each one of the rotor blades 10. Blade pitch signals obtained by the pitch sensors 24 are sent to the pitch controller 25. In this embodiment, the pitch monitoring system 22 makes use of the same pitch controller 25 as the pitch control system 21, but in other embodiments, different controllers may be used for the different systems. Using the pitch signals from the pitch sensor 24, the pitch control system 21 implements a closed loop control strategy to operate the pitch actuator 26 and to ensure that the pitch angle of each rotor blade 10 follows the respective pitch reference signal as accurately as possible.

When the pitch monitoring system 22 determines that the pitch deviation exceeds an allowable threshold, the pitch controller 25 sends a signal to the master wind turbine control system 23, such that appropriate safety measures can be taken. For example, the wind turbine 1 may be shut down in order to prevent structural damage to the rotor blade 10, the pitch control system 21 or other parts of the wind turbine 1. Alternatively, the wind turbine 1 may be operated in a derated speed or derated power mode, or the blade pitch may be increased in order to slow down the rotor.

Figure 3:
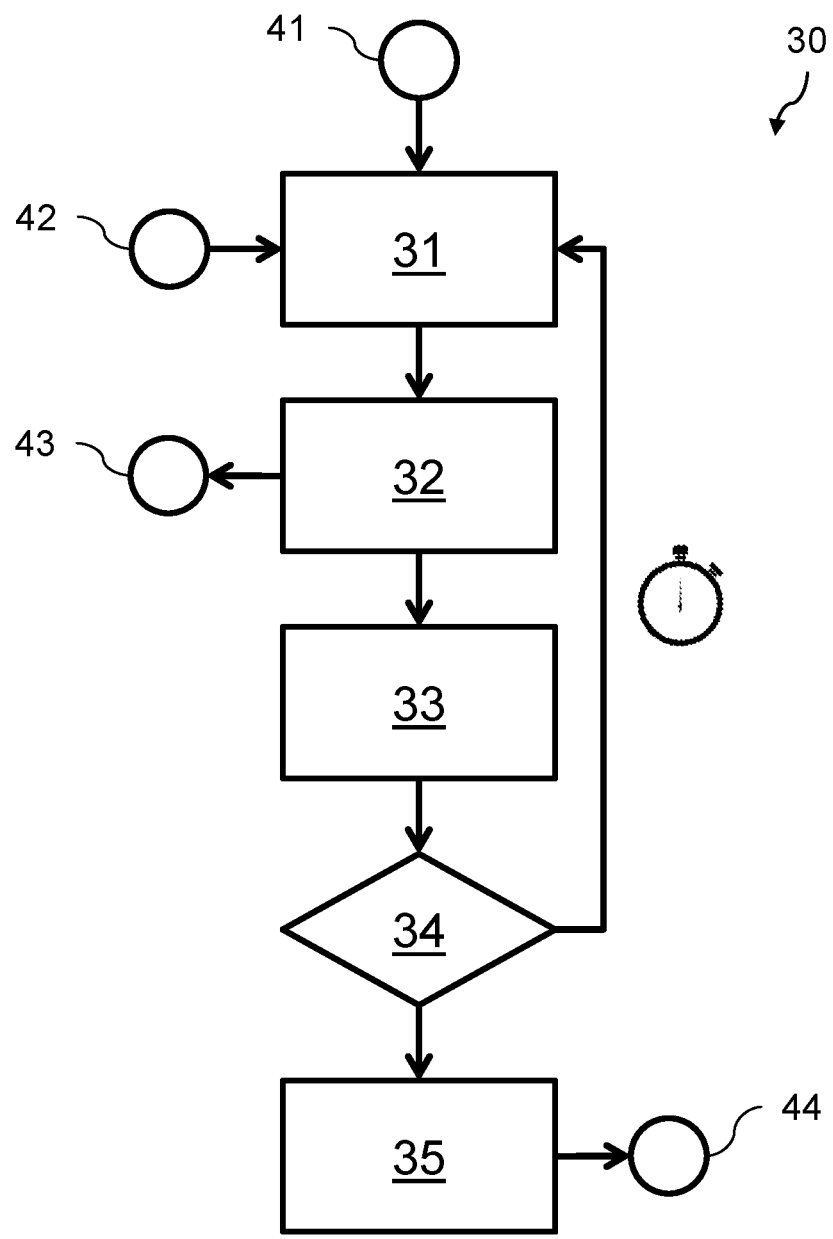
FIG. 3 is a flow diagram of an embodiment of a method according to the invention.

FIG. 3 is a flow diagram of a pitch monitoring control loop 30 that may be implemented in the pitch monitoring system 22 of FIG. 2. The pitch monitoring control loop 30 starts with an input stage 31, wherein the pitch monitoring system 22 receives a blade pitch signal 41 from a pitch sensor 24 of one of the rotor blades 10. The blade pitch signal is representative of the current pitch angle of the respective rotor blade 10. In addition to the blade pitch signal 41, the pitch monitoring system 22 may receive a blade pitch reference 42 from the master wind turbine control system 23. When no blade pitch reference 42 is received, a default value or a previously stored value may be used instead, or the wind turbine operation may be stopped for safety.

Then, at an actual monitoring stage 32, the pitch signal 41 is compared to the blade pitch reference 42 to determine a current pitch deviation 43. Due to, e.g., control delays, mechanical tolerances and dynamic external conditions, some pitch 43 deviation will usually be detected. The thus determined pitch deviation 43 is then used in a separate pitch control loop that may be executed by the same pitch controller 25 as the pitch monitoring control loop 30. The aim of this pitch control loop is to keep any pitch deviations 43 as small as possible and to make sure that any larger pitch deviations 43 do not persist for too long.

In order to assess whether the determined pitch deviation 43 is too large for too long, the method according to the invention maintains a pitch deviation variable. In pitch deviation assessment stage 33, this pitch deviation variable is updated using the pitch deviation 43 as determined in the monitoring stage 32.

The algorithm for determining and updating the pitch deviation variable can be adapted to the situation. For example, weather conditions, a wind turbine type, a wind turbine maintenance history, or preferences concerning pitch control strategies may determine the exact algorithm used for determining the pitch deviation variable. However, all algorithms that may be used have at least in common that they take into account the pitch deviation 43 as determined in the monitoring stage 32, a first pitch deviation threshold, and a duration of a time period during which the determined pitch deviation 43 has been exceeding the first pitch deviation threshold. Additional parameters that may, e.g., be taken into account are:

a second pitch deviation threshold that is higher than the first pitch deviation threshold, the maximum time period that the pitch is accepted to be at the first pitch deviation threshold, and the maximum time period that the pitch is accepted to be at the second pitch deviation threshold.

Just as an example, typical values for the lower and first pitch deviation threshold may be in the range of 1 to 3 degrees, e.g., 2 degrees and the maximum time period that the pitch deviation is accepted to exceed this threshold is in the order of seconds, e.g., 1 to 2 seconds. Typical values for the higher and second pitch deviation threshold may be in the range of 4 to 6 degrees, e.g., 4.5 degrees and the maximum time period that the pitch deviation is accepted to exceed this threshold is only a fraction of a second, e.g., 0.01 second.

As long as the pitch deviation 43 remains below the first pitch deviation threshold, the pitch deviation is tolerated. The pitch control system 21 may, however, aim to further reduce the pitch deviation 43 to further optimise the operation of the wind turbine 1. When the pitch deviation 43 exceeds the first pitch deviation threshold, the pitch deviation variable is increased. When, later, the pitch deviation 43 drops below the first pitch deviation threshold, the pitch deviation variable is either decreased or reset to zero, depending on the strategy that is preferred for that particular situation.

In a trigger stage 34, it is checked whether the pitch deviation variable exceeds a pitch deviation variable threshold. When it does, at stage 35 an error signal 44 will be generated, which may, e.g., be communicated to the master wind turbine control system 23. In response to this error signal 44, an alarm may be activated and/or safety measures, such as shutting down the wind turbine may be automatically initiated. If the pitch deviation variable does not exceed the pitch deviation variable threshold, the control loop 30 returns to the input stage 31 for receiving a subsequent blade pitch signal 41.

Typically, new blade pitch signals 41 are received and processed on a regular basis, with one measurement per fixed sampling period. Alternatively, the sampling time of the control loop 30 may vary. For example, the sampling time may be reduced when the accuracy of the monitoring process is more important and/or when more processing power is available. Since the algorithm used in the pitch deviation assessment stage 33 depends on the duration of a time period during which the determined pitch deviation 43 has been exceeding the first pitch deviation threshold, this sampling time is used as an input for the pitch deviation assessment algorithm.

As explained above, the particular algorithm used for the pitch deviation assessment may vary per wind turbine 1 and over time. Below a Model A and a Model B algorithm will be discussed, but it is noted that the invention is not limited to these two algorithms. Depending on the specific needs for the operation of the wind turbine 1, alternative algorithms may be used.

The Model A algorithm is designed specifically to be more responsive to the size of the pitch deviation than to its duration. Larger deviations above the first pitch deviation threshold will quickly result in an error signal. Smaller deviations, just above the first pitch deviation, are tolerated for longer periods of time. In Model A, the pitch deviation variable is based on an algorithm that provides a running counter that is increased every time it is detected that the first pitch deviation threshold is exceeded. The algorithm is designed such that for larger deviations, the counter increase is considerably higher than for smaller deviations. In a simplified form, the counter may, e.g., by determined using the following formula:

$$\sum_t \frac{T_s}{a - b \cdot P_{error}} > 1$$

Wherein:

$P_{error}$=the current pitch error, based on the measured pitch sensor signal and the reference pitch as prescribed by the master wind turbine control system 23, $T_S$=the sampling time, i.e. the time between two consecutive measurements of the pitch sensor signal, and a, b=various constants that depend on, e.g., the lower and higher pitch deviation thresholds and the maximum amount of time that the pitch is accepted to be at the respective pitch deviation thresholds.

As can be seen from the exemplary counter formula of Model A, larger pitch deviations will lead to a smaller denominator and thus a larger increase of the running counter. The constants are a and b are selected to ensure that a pitch deviation close to the second pitch deviation threshold leads to a denominator value close enough to zero to ensure that the safety mode will be activated quickly, preferably already after one or only a few sampling periods at this second pitch deviation threshold. For pitch deviations closer to the first pitch deviation threshold, the denominator will be large enough to only lead to a moderate increase of the counter value.

When the pitch deviation drops below the first pitch deviation threshold, the counter may, e.g., be reduced by a standard value or by an amount that depends on how far the pitch deviation drops below the first pitch deviation threshold. For example, if a pitch deviation that is an x amount above the first pitch deviation threshold leads to an increase of the counter value by an amount y, then a pitch deviation that is an x amount below the first pitch deviation threshold may lead to an decrease of the counter value by the same amount y. Alternatively, the counter may be completely reset to zero.

The Model B algorithm is designed specifically to be more responsive to the duration of the pitch deviation than to its size. Smaller deviations, just above the first pitch deviation threshold will result in an error signal 44, quicker than when using the Model A algorithm. Larger deviations that only occur for a short period of time do not trigger the error signal 44 as fast as the Model A algorithm does. In Model B, the pitch deviation variable is based on an algorithm that uses a simple running counter that tracks the total amount of time that the pitch deviation has continuously exceeded the first pitch deviation threshold. This total amount of time is then multiplied by some factor, dependent on the most recent pitch deviation measurement. With this Model B algorithm, the pitch deviation variable is set to zero as soon as the pitch deviation drops below the first pitch deviation threshold. Whether the value of the running counter results in an error signal 44 or not depends on the current value of the pitch deviation. The algorithm is designed such that a lower (running) counter will trigger the error signal faster for smaller pitch deviations than for larger pitch deviations. This brings the advantage that a short peak in the pitch deviation that does not immediately trigger the error signal 44 will not anymore affect the pitch deviation assessment after the pitch deviation has dropped to lower levels. In a simplified form, the pitch deviation variable may, e.g., by determined using the following formula:

Model B:

$$\frac{\sum_t T_s}{P_{error} \cdot (a - b \cdot P_{error})} > 1$$

Wherein:

$P_{error}$=the current pitch error, based on the measured pitch sensor signal and the reference pitch as prescribed by the master wind turbine control system 23, $T_S$=the sampling time, i.e. the time between two consecutive measurements of the pitch sensor signal, and a, b=various constants that depend on, e.g., the lower and higher pitch deviation thresholds and the maximum amount of time that the pitch is accepted to be at the respective pitch deviation thresholds.

The constants are a and b may be selected to ensure that larger pitch deviations lead to a denominator value that may be smaller than the denominator value corresponding to smaller pitch deviations, but only to a limited extent. Consequently, short-term higher pitch deviations, close to the second pitch deviation threshold, will not immediately trigger the error signal. Longer periods of either small or large pitch deviations will trigger the error signal.

The illustrated embodiments discussed above demonstrate various technical implementations of the inventive concept. However, it will be appreciated by the skilled person that other variations may be made apart from those detailed above and yet still fall within the scope of the appended claims. It will also be appreciated by the skilled person that the invention may relate to tower structures other than those for wind turbines.

The invention claimed is:

1. A method for monitoring a pitch control system for a rotor blade of a wind turbine, the method comprising:
   receiving a blade pitch signal representative of a pitch position of the rotor blade;
   determining a pitch deviation, based on the blade pitch signal and a blade pitch reference;
   upon determining the determined pitch deviation exceeds a first pitch deviation threshold, increasing a pitch deviation variable by an amount inversely proportional to a difference between the determined pitch deviation and the first pitch deviation threshold, wherein the amount depends on:
      the determined pitch deviation,
      the first pitch deviation threshold, and
      a duration of a time period during which the determined pitch deviation exceeds the first pitch deviation threshold; and
   providing an error signal when the increased pitch deviation variable exceeds a pitch deviation variable threshold.

2. The method of claim 1, further comprising:
   upon determining the determined pitch deviation is below the first pitch deviation threshold, decreasing the pitch deviation variable by an amount that depends on the determined pitch deviation.

3. The method of claim 1, further comprising:
upon determining the determined pitch deviation is below the first pitch deviation threshold, resetting the pitch deviation variable.

4. The method of claim 1, wherein the amount for increasing the pitch deviation variable further depends on a second pitch deviation threshold, the second pitch deviation threshold being higher than the first pitch deviation threshold.

5. The method of claim 1, wherein the pitch deviation variable threshold is dependent on the determined pitch deviation.

6. The method of claim 1, further comprising shutting down the wind turbine in response to the error signal.

7. A monitoring system for a pitch control system of a wind turbine, the monitoring system comprising:
- a pitch sensor for measuring a pitch angle of a rotor blade of the wind turbine, the pitch sensor being configured to provide a blade pitch signal representing the measured pitch angle; and
- a controller, operatively coupled to the pitch sensor for receiving the blade pitch signal therefrom, the controller being configured to:
  - determine a pitch deviation, based on the blade pitch signal and a blade pitch reference,
  - upon determining the determined pitch deviation exceeds a first pitch deviation threshold, increase a pitch deviation variable by an amount that depends on:
    - the determined pitch deviation,
    - the first pitch deviation threshold, and
    - a duration of a time period during which the determined pitch deviation exceeds the first pitch deviation threshold, wherein in a first mode of the monitoring system, the amount for increasing the pitch deviation variable is inversely proportional to a difference between the determined pitch deviation and the first pitch deviation threshold, and
    - wherein in a second mode of the monitoring system, the amount for increasing the pitch deviation variable is proportional to a continuous time period during which the determined pitch deviation exceeds the first pitch deviation threshold and inversely proportional to an order two polynomial form of the difference between the determined pitch deviation and the first pitch deviation threshold; and
  - provide an error signal when the increased pitch deviation variable exceeds a pitch deviation variable threshold.

8. The monitoring system of claim 7, further comprising a safety controller operatively coupled to the controller and configured to operate the wind turbine in a safe mode in response to the error signal.

9. A wind turbine comprising:
- at least one rotor blade;
- a pitch control system for controlling a pitch angle of the at least one rotor blade; and
- a controller configured to:
  - determine a pitch deviation, based on a blade pitch signal of the at least one rotor blade and a blade pitch reference,
  - upon determining the determined pitch deviation exceeds a first pitch deviation threshold, increase a pitch deviation variable by an amount proportional to the duration of a continuous time period, wherein the amount depends on:
    - the determined pitch deviation,
    - the first pitch deviation threshold,
    - a total duration of the continuous time period during which the determined pitch deviation exceeds the first pitch deviation threshold, and
    - a duration of a time period during which the determined pitch deviation exceeds the first pitch deviation threshold, and
  - provide an error signal when the increased pitch deviation variable exceeds a pitch deviation variable threshold.

* * * * *